Feb. 10, 1953   M. E. GILWOOD   2,628,194
PROCESS OF AND APPARATUS FOR REGENERATING ION EXCHANGERS
Filed Dec. 28, 1950
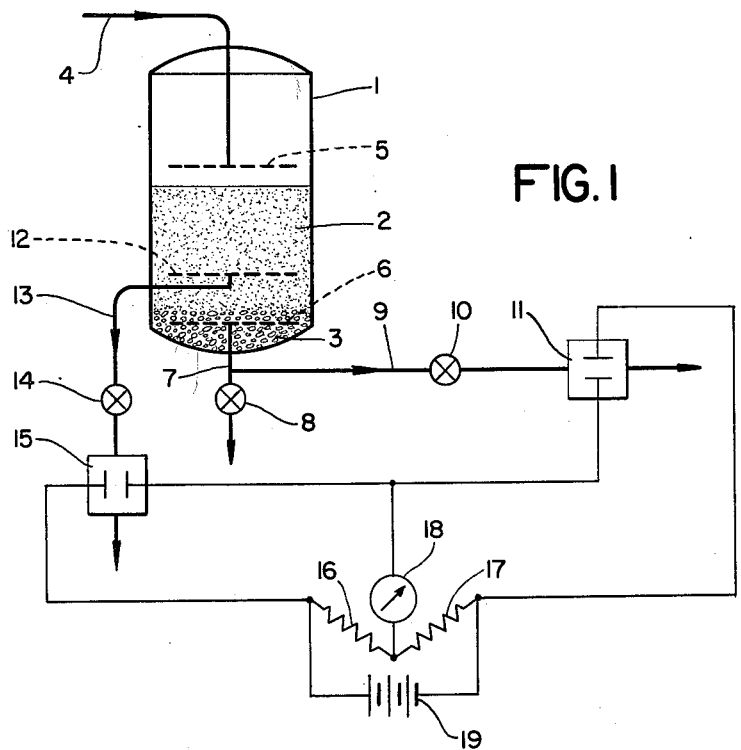
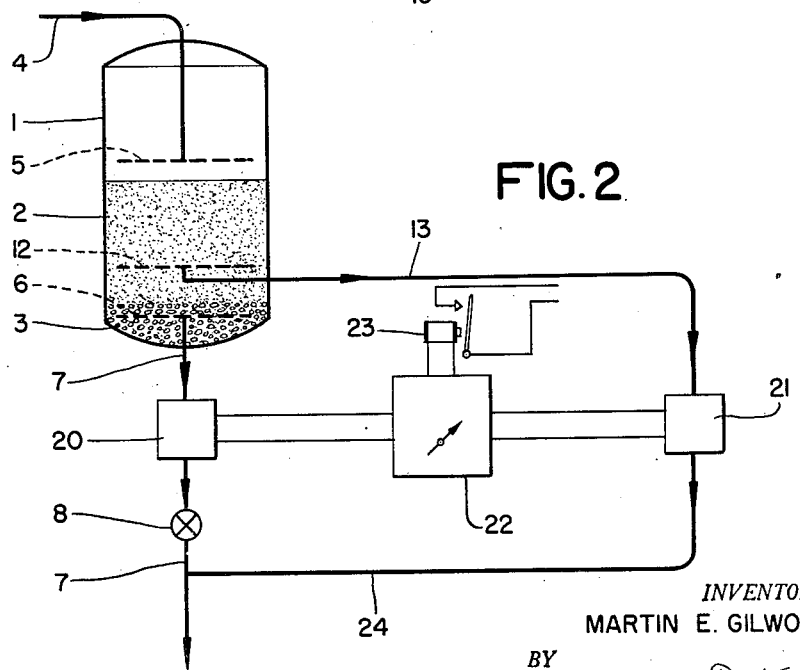
INVENTOR.
MARTIN E. GILWOOD
BY
Clarence D. Kerr
ATTORNEY.

Patented Feb. 10, 1953

2,628,194

UNITED STATES PATENT OFFICE 2,628,194

PROCESS OF AND APPARATUS FOR REGENERATING ION EXCHANGERS

Martin E. Gilwood, Hollis, N. Y., assignor to The Permutit Company, New York, N. Y., a corporation of Delaware Application December 28, 1950, Serial No. 203,165
In Great Britain December 30, 1949

5 Claims. (Cl. 210—24)

This invention relates to the regeneration of a bed of cation exchange material through which is passed a liquid containing cations. More particularly, the invention is concerned with a process and apparatus for determining easily and accurately when to regenerate a bed of hydrogen ion exchange material that is used in the treatment of such a liquid.

The invention is concerned particularly with ion exchange processes in which metallic cations contained in the liquid being treated are exchanged for hydrogen ions held by the exchange material. For example, this occurs when water or other liquids containing dissolved salts flows through a bed of cation exchange material that is charged with exchangeable hydrogen ions. During the operating or working part of the cycle, the salts in the liquid are converted to the corresponding acids.

After liquid has flowed through a bed of exchange material of a given size for a sufficient time, the exchange material gradually becomes depleted in exchangeable hydrogen ions and eventually reaches a point at which it needs regeneration. Regeneration of the exchange material is customarily effected with a dilute acid solution.

In general, two methods have been followed heretofore for determining the point at which the exchange material becomes sufficiently exhausted to require regeneration with the acid solution. One method is to operate the bed until a predetermined volume of the liquid has been passed through it and then to regenerate the bed at this point without making any actual determination to find out whether the bed is exhausted or not. If this method is to be used successfully, a certain allowance has to be made for fluctuations in the composition of the liquid being treated, or for other variables in the process, with the result that the bed is frequently regenerated while it still has considerable usable exchange capacity.

The other principal method used has been to determine the end point by examination of samples of the effluent. The effluent may be analyzed chemically from time to time but this process is, of course, tedious, expensive and requires the services of an expert operator. The end point may also be determined by measuring from time to time the pH or conductivity of samples of the effluent. This method again requires considerable work and, in addition, is not entirely accurate because a change in pH or conductivity of the effluent may be produced by a change in composition of the influent and not by depletion of the bed of exchange material.

It is an object of this invention to provide a process and apparatus for determining accurately and simply the point at which a bed of hydrogen ion exchange material requires regeneration.

It is also an object of this invention to provide such a method and apparatus which operates entirely independent of fluctuations in the composition of the liquid being treated.

Another object of the invention is to provide apparatus for determining accurately and automatically when the exchange bed requires regeneration.

These and other objects of the invention will be explained and will be apparent from the following description taken in conjunction with the drawings, in which Fig. 1 is a diagrammatic illustration of a hydrogen ion exchange unit equipped to indicate visually when the unit needs regeneration.

Fig. 2 is a similar diagrammatic view of a hydrogen ion exchange unit showing a modified arrangement to indicate by an alarm or other signal when the unit needs regeneration, or to initiate the regeneration automatically.

This invention utilizes the fact that as liquid to be treated is passed through a bed of ion exchange material the bed of exchange material does not become exhausted uniformly throughout its mass but rather becomes more and more exhausted progressively through the bed in the direction of flow of the liquid. In other words, regardless of the total length of the bed there is always what may be regarded as an end layer in which exchange reactions take place even after the bulk of the bed has lost its full or principal capacity for such exchange reactions. As an operating run of liquid flowing through a hydrogen exchange bed proceeds, this end layer gradually decreases in thickness.

In accordance with my invention, I tap off some of the liquid flowing through the ion exchange bed at a point a short distance upstream from the point at which the main body of liquid leaves the bed. I measure the conductivity of this tapped off stream of liquid and of the main effluent from the bed and compare them. In this manner, it is a relatively easy matter to determine when the last layer of ion exchange material begins to do the bulk of the work of the bed in converting salts in the raw liquid to their corresponding acids. The difference in conductivity occurs because hydrogen ions have an appreciably higher conductivity than the metallic cations, sodium, calcium, magnesium or the like which usually occur in such liquids. It is not feasible in such a process to utilize the conductivity of the influent as a basis for comparison.

The point at which the liquid is tapped off from the bed for this conductivity measurement and comparison may vary, of course, with the size of the bed and also with various other operating conditions. By way of illustration, however, the liquid may be tapped off from a bed of usual size at any point from about 4″ to 18″ upstream from the outlet side of the bed. It is only necessary that the tap-off point be removed far enough from the outlet side of the bed to leave a layer of appreciable thickness of ion exchange material which is capable of doing some useful work on the liquid being treated. It is important that the liquid removed as the sample effluent should be a true sample of the whole liquid passing through the bed at the point in question. This may be accomplished by extracting the tapped off or sample effluent through a collecting system having a number of openings spaced apart over the cross-section of the bed.

Referring now to the drawings, Figure 1 illustrates a hydrogen ion exchange unit 1 which contains a bed 2 of hydrogen zeolite resting on a bed of gravel or similar inert material 3. The liquid to be treated is introduced into the exchange unit through a pipe 4 and distributor 5. The liquid from the distributor 5 flows down uniformly through the bed and the effluent may be removed by a collector 6 which is embedded in the gravel and which supplies the liquid to an outlet pipe 7 fitted with a control valve 8.

A small portion of the effluent from the bed may be by-passed through the pipe 9 fitted with the valve 10, this sample portion being passed through a conductivity cell 11. Several inches above the bottom of the zeolite bed, a second collector 12 is embedded in the ion exchange material and a small sample of liquid is tapped off from the bed at this point through the pipe 13 controlled by valve 14 and passed through the conductivity cell 15.

The conductivity cells 11 and 15 are connected electrically to fixed resistances 16 and 17 so as to form with the galvanometer 18 a Wheatstone bridge. Current may be supplied by the battery 19. Thus with the resistances 16 and 17 being equal, the galvanometer is not deflected as long as the resistances of the conductivity cells 11 and 15 are equal to each other. The resistances in the conductivity cells 11 and 15 will remain approximately equal as long as the portion of the hydrogen ion exchange material between the collector 12 and the gravel bed 6 is not doing any appreciable work. However, when the upper portion of the bed begins to become exhausted, the liquid tapped off will begin to contain more and more metallic cations compared to the main effluent. The conductivity of the cell 15 will therefore become less and less, while the conductivity in the cell 11 remains substantially constant thus deflecting the needle of the galvanometer 18 an amount proportional to the degree of imbalance thus created.

The galvanometer may be calibrated or simply marked at a point selected for the conditions of operation employed as the best regeneration point. When the needle reaches this mark, the flow of raw liquid into the unit through the pipe 14 is stopped and the unit is regenerated with an acid solution in the usual manner. During regeneration, of course, the valves 10 and 14 are closed.

The apparatus illustrated in Fig. 2 is similar to that described above and consists essentially of a hydrogen ion exchange unit 1 containing a bed 2 of hydrogen zeolite supported on the gravel 3. The water or other liquid to be treated is supplied to the unit through the pipe 4 and the effluent is drawn off through a collector 6 and pipe 7. In this case the main effluent is passed through the conductivity cell 20 and thence goes directly to service. A small sample of the liquid is removed from the bed through a collector 12 spaced a few inches above the gravel 3. This sample of liquid is drawn off through pipe 13 and after passing through a conductivity cell 21 is returned by the pipe 24 to the pipe 7 leading to service. The conductivity cells 20 and 21 are connected to a Wheatstone bridge 22 as previously described. In this case, however, the Wheatstone bridge device is arranged so that it can be set to operate a relay 23 when the current through the galvanometer reaches a certain value. In this way the regeneration operation can be made automatic and the relay can be used to sound an alarm or other signal, or to initiate the actual regeneration operation itself by operating motor driven valves.

By way of example, the process of this invention was tested on a cylindrical bed of hydrogen zeolite of the sulfonated coal type that measured 4″ in diameter and 27″ in depth. Sample points were used successfully at locations 4″ and 5″ above the bottom of the bed. In this example the unit was used for conditioning water having the following analysis expressed in terms of p. p. m. of $CaCO_3$—

| | |
|---|---|
| Calcium | 285 |
| Magnesium | 143 |
| Sodium | 6 |
| Bicarbonate | 115 |
| Chloride | 305 |
| Sulfate | 14 |

The following data was obtained on a run made using an upstream tap 5″ above the gravel of the hydrogen exchange unit.

| Total Eff., Liters | Free Mineral Acidity Effluent | FMA upstream tap | Ratio— Effluent Conductivity Upstream Tap Conductivity |
|---|---|---|---|
| 24.0 | 312 | 310 | 1.05 |
| 79.0 | 312 | 310 | 1.05 |
| 162.8 | 312 | 310 | 1.05 |
| 229.1 | 300 | 296 | 1.08 |
| 272.8 | 278 | 220 | 1.25 |
| 286.7 | 227 | 99 | 1.82 |
| 294.5 | 226 | 53 | 2.27 |
| 303.8 | 215 | 8 | 2.95 |

The foregoing data indicate that the ratio of conductivity of the effluent to conductivity of the tapped-off sample remains fairly constant for a considerable period of time during the run and then increases quite sharply. Consequently, this gives an end point which is not only accurate but usually quite sharp.

A particular advantage of this invention compared with the usual methods of determining the end of a run is that the end of the run is determined so that regeneration can be initiated immediately before it is needed.

The terms and expressions which I have employed are used as terms of description and not of limitation, and I have no intention, in the use of such terms and expressions, of excluding

I claim:

1. A process of operating a hydrogen ion exchanger containing a bed of hydrogen ion exchange material through which a liquid containing dissolved salts is flowed which comprises tapping off a small stream of the liquid from the interior of the bed at a point upstream and spaced from the point at which the main effluent leaves the bed, measuring the acidities of the two liquids, and regenerating the bed when the measured acidities become substantially different from each other.

2. Apparatus for determining when to regenerate a bed of ion exchange material through which a liquid to be treated is flowed which comprises, means for tapping off a sample of the liquid from within the bed at a point upstream and spaced from the point at which the main effluent leaves the bed, means for measuring the conductivities of said sample and of the main effluent from the bed, and means for comparing the conductivities thus measured.

3. Apparatus for determining when to regenerate a bed of ion exchange material through which a liquid to be treated is flowed which comprises, means for tapping off a small stream of the liquid from within the bed at a point upstream and spaced from the point at which the main effluent leaves the bed, separate conductivity cells, means for passing at least a portion of said stream through one of said cells, means for passing at least a portion of the main effluent through the other of said cells, and means for comparing automatically the conductivities measured by said cells.

4. Apparatus as defined in claim 3 in which the conductivity cells are electrically connected as separate arms of a Wheatstone bridge, and a relay is connected across the bridge so that current flows through the coil of the relay only when the conductivities measured by said cells differ from each other.

5. A process of operating a hydrogen ion exchanger in which a liquid to be treated is flowed through a bed of hydrogen ion exchange material which comprises tapping off a sample of the liquid from the bed at a point a short distance upstream and spaced from the point at which the main effluent leaves the bed, measuring the conductivities of said sample and of said main effluent, and regenerating the bed when said conductivities become substantially different from each other.

MARTIN E. GILWOOD.

REFERENCES CITED

The following references are of record in the file of this patent:

UNITED STATES PATENTS

| Number | Name | Date |
|---|---|---|
| 1,145,509 | Pike et al. | July 6, 1915 |
| 1,701,331 | Merrill | Feb. 5, 1929 |
| 2,003,760 | Sweeney et al. | June 4, 1935 |
| 2,209,487 | Wagner | July 30, 1940 |
| 2,351,648 | Whitlock | June 20, 1944 |

FOREIGN PATENTS

| Number | Country | Date |
|---|---|---|
| 569,660 | Great Britain | June 4, 1945 |